Dec. 29, 1942.  B. S. STANFIELD  2,306,762
DRILL GRINDING GAUGE
Filed Nov. 18, 1941

Inventor
BEN STANLEY STANFIELD
By Young, Emery & Thompson
Attys.

Patented Dec. 29, 1942

2,306,762

UNITED STATES PATENT OFFICE 2,306,762

DRILL GRINDING GAUGE

Ben Stanley Stanfield, Baltimore, Md.

Application November 18, 1941, Serial No. 419,627

8 Claims. (Cl. 33—201)

This invention relates in general to twist drills and more particularly has reference to means for assisting in the grinding or sharpening of the cutting edges of twist drills.

Twist drills are used in various manufacturing and repair plants and shops and it is quite important that the drills be properly ground to provide them with cutting edges at the correct angle relative to the axis of the drill for the most efficient and accurate cutting ability.

Many drills are sharpened by hand grinding in which the drill is held by the workman against the grinding wheel. Considerable skill is required to properly grind a drill in this manner. Machine grinders have been developed but even though they are rather costly, the drills sharpened thereby are not as useful to the drilling machine operator as hand ground drills when properly ground.

The principal object of this invention is to provide a gauge or drill marking device to assist in the hand grinding of twist drills.

Another object of this invention is to provide a gauge having a surface for contacting the cutting edges of a twist drill and flattening the high regions of said edges so that the drill grinder will know where to grind the drill to provide it with a proper cutting edge.

A further object of this invention is to provide a gauge having a bore to receive a twist drill, and a conical bottom in the bore the conicity of which corresponds to the angle to which the cutting edges are to be ground.

Still another object of this invention is to provide a method of hand grinding twist drills which comprises the steps of grinding the cutting edges of a drill, rotating the cutting edges of the drill against a concave conical surface coaxial with the drill and having a conicity equal to the angle to which the cutting edges of the drill are to be ground to flatten the high regions of said cutting edges and then grinding the drill to remove said high regions.

A still further object of this invention is to provide a drill gauge having a conical surface for engaging the cutting edges of a drill to mark the latter.

With these and other objects in view which may appear more fully hereinafter the invention resides in the parts and combinations and steps shown and described in the following specification and appended drawing.

Figure 1:
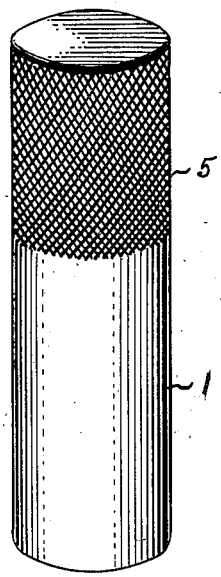
Fig. 1 is a perspective view of a device according to the present invention.
Figure 2:
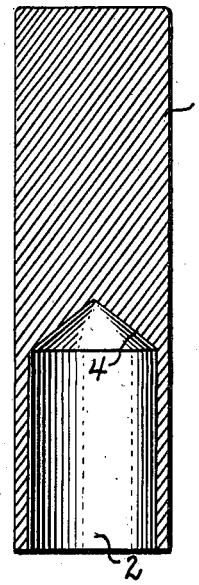
Fig. 2 is a vertical axial sectional view of the device shown in Fig. 1.

As indicated in the drawing the gauge or drill cutting edge marking device comprises a body 1 of metal or other suitable material. As shown, the body may be cylindrical in form but obviously the exterior configuration may be of any desired or preferred shape. Extending axially of the cylindrical body 1 is a bore 2. This bore is of a diameter slightly larger than the maximum diameter of a drill 3 to be inserted therein so that a so-called "slip fit" will exist between the bore and the drill.

At the closed end or "bottom" of the bore 2 there is a concavo-conical surface 4.

The conicity or angle between a plane tangent to the conical surface and the axis thereof is that which the cutting edges of the drill will bear relative to the axis of the finally-ground drill. This angle will vary for the particular work for which the drill is to be used being less for high production output and greater for precision manufacture. In any event the conicity of the conical surface 4 is identical to the angle of the particular drill to be ground as pointed out above.

On the exterior surface of the gauge body 1 knurling 5 or other roughening is provided to facilitate holding or gripping of the gauge between the fingers of the operator as will be described more fully hereinafter.

The gauge may be made of tool steel and hardened or made of any suitable metal or other substance so long as a conical surface can be formed therein capable of contacting and making the cutting edges of a twist drill as hereinafter described.

In the grinding of a twist drill by hand the cutting edges are sharpened and the end surfaces of the drill from the cutting edges toward the trailing edges thereof are ground away to provide suitable clearance so that the cutting edge will cut into the material being drilled. Quite often due to imperfections in the surface of the grinding wheel or for other reasons, the cutting edge just ground has high and low places therein which can scarcely be detected by the eye but which nevertheless serve to seriously impair the efficiency and life of the cutting edges of the drill.

Figure 3:
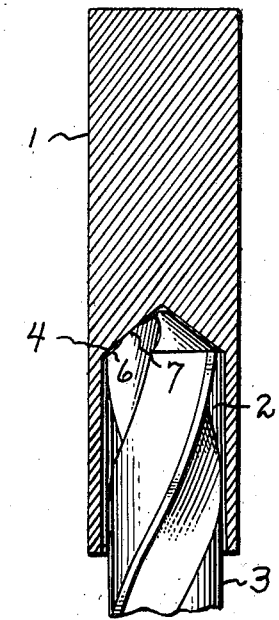
Fig. 3 is a view similar to Fig. 2 showing a drill in operative position in the device.
Figure 4:
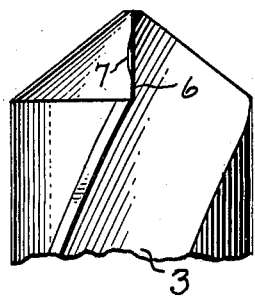
Fig. 4 is an enlarged fragmentary view of a drill exaggeratedly illustrating the marking effect of the device.

When a drill 3 so ground is inserted in the bore of the gauge made according to the present invention and the drill and gauge rotated relatively to each other with the cutting edges 6 of the drill in engagement with the conical surface 4, with slight pressure the high portions 7 of the cutting edges will first contact the conical surface as illustrated on an exaggerated scale in Fig. 3. After rubbing the cutting edge 6 against the conical surface 4 the high portions 7 of the cutting edge will be dulled or flattened as indicated on an exaggerated scale in Fig. 4. Upon inspection of the cutting edges of the drill after rubbing the same in contact with the conical surface 4 the operator will see where further grinding of the drill is required. Quite often the dulled or flattened high portions of the cutting edges will be difficult to see but if the drill is moved about in the operator's hand until the light strikes the flattened surfaces at the proper angle, the light will be reflected by said surfaces into the eyes of the operator.

By repeating the operation if necessary, accurate sharp cutting edges of high efficiency and long life will be obtained.

Generally the high points on the cutting edges are so slight and so easily marred by rubbing in contact with the conical surface that only slight further grinding of the drill is necessary.

Drills ground with the aid of the gauge according to the present invention may be quickly and accurately ground. In actual practice it has been found that the output and efficiency of a drill grinding operator is considerably increased.

While the present invention has been described in connection with twist drills, it is also applicable to bottom drills, counterbores, countersink and reamers. In such instances the surface of the gauge which is adapted to rub the cutting edge or edges of the tool is shaped to conform to the cutting edges.

Having described my invention, I claim:

1. A drill grinding aid device comprising a body having a drill receiving bore therein, said bore having a conical bottom therein corresponding in conicity to the cutting end of the drill, said bore being adapted to maintain accurate register of the cutting end of the drill with said conical bottom.

2. A gauge for assisting in grinding twist drills comprising a body having a bore therein for receiving a drill and being of a diameter just sufficiently larger than the diameter of a drill to be gauged to provide a slip fit, said bore having a concavo-conical bottom the conicity of which is identical to that to which the drill is to be ground.

3. A gauge for assisting in grinding twist drills comprising a body having a bore therein for receiving a drill and being of a diameter just sufficiently larger than the diameter of a drill to be gauged to provide a slip fit, said bore having a concavo-conical bottom the conicity of which is identical to that to which the drill is to be ground, said bottom being formed of hardened metal so that when the cutting end of the drill is rotated in engagement with the conical bottom the portions of the cutting edge of the drill which need to be further ground will be marked.

4. A gauge for assisting in grinding twist drills comprising a cylindrical tubular body having an internal diameter slightly larger than the diameter of a drill to be gauged to provide a slip fit of the drill in said tube, a concavo-conical bottom in said tube, the angle of the cone of said bottom being equal to the angle to which the cutting edge of the drill is to be ground, and means on the exterior surface of the tubular body to facilitate rotation thereof between the fingers.

5. A gauge for assisting in grinding twist drills comprising a cylindrical tubular body having an internal diameter slightly larger than the diameter of a drill to be gauged to provide a slip fit of the drill in said tube, a concavo-conical bottom in said tube, the angle of the cone of said bottom being equal to the angle to which the cutting edge of the drill is to be ground, and means on the exterior surface of the tubular body to facilitate rotation thereof between the fingers, said bottom being formed of hardened metal so that when the cutting end of the drill is rotated in engagement with the conical bottom the portions of the cutting edge of the drill which need to be further ground will be marked.

6. A drill grinding aid device comprising a body having a concavo-conical recess therein corresponding in conicity to the cutting end of a twist drill, and means on said body for guiding the shank of the drill to maintain accurate coaxial register of its cutting end with said concavo-conical recess.

7. A rotary cutting tool grinding aid device comprising a body having therein a recessed surface of revolution the generator of which corresponds to the true shape to which the cutting edge of the tool is to be ground, and means rigid with said body for engaging the sides of the tool to maintain its cutting edges thereof in proper contact relation with said surface of revolution, said means permitting rotation of the drill in the device.

8. A rotary cutting tool grinding aid device comprising a body having therein a smooth and hard surface of revolution the generator of which corresponds to the true shape to which the cutting edge of the tool is to be ground, and means rigid with said body for engaging the sides of the tool to maintain its cutting edges thereof in proper contact relation with said surface of revolution, said means permitting rotation of the drill in the device.

BEN STANLEY STANFIELD.